March 11, 1958     H. F. FEUERLEIN     2,826,034
ROTARY RAKE AND SICKLE FOR ATTACHMENT FOR LAWN MOWER
Filed June 24, 1954     2 Sheets-Sheet 1
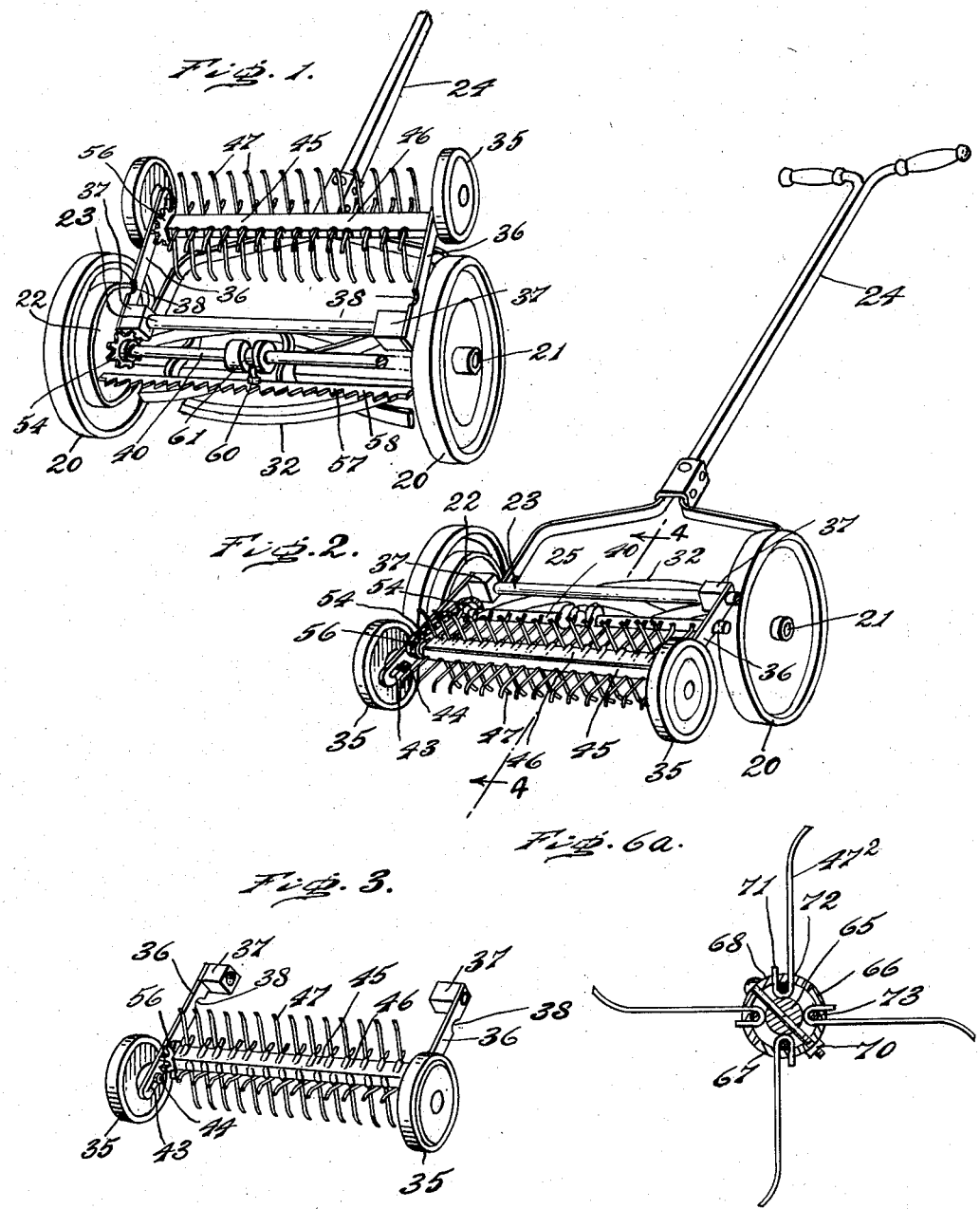
INVENTOR
BY
ATTORNEYS.

March 11, 1958     H. F. FEUERLEIN     2,826,034
ROTARY RAKE AND SICKLE FOR ATTACHMENT FOR LAWN MOWER
Filed June 24, 1954     2 Sheets-Sheet 2

INVENTOR.
Hugo F. Feuerlein
BY
ATTORNEYS.

even either hand driven or power driven, a hand driven form
United States Patent Office 2,826,034
Patented Mar. 11, 1958

2,826,034

ROTARY RAKE AND SICKLE FOR ATTACHMENT FOR LAWN MOWER

Hugo F. Feuerlein, Philadelphia, Pa.

Application June 24, 1954, Serial No. 439,011

1 Claim. (Cl. 56—400.02)

The present invention relates to lawn mowers and particularly those which are adapted to cut long grass, matted grass, or grass of varying lengths.

A purpose of the invention is to make it possible to cut long grass or grass of varying lengths by a lawn mower either of the hand or power operated variety.

A further purpose is to minimize the amount of rolling down or matting of grass by the lawn mower and to insure that all grass of suitable length will be cut.

A further purpose is to avoid having grass clog the lawn mower and impede action of the rotary cutters.

A further purpose is to straighten the grass to full length before it is cut, and then preferably to first cut off the relatively long grass ends by a sickle bar and then cut the remaining ends to normal length by a rotary cutter operating against the anvil.

A further purpose is to mount the rotary rake on a pivotal frame which will swing out of the way against the handle of the lawn mower.

A further purpose is to drive the rotary rake and desirably also the sickle bar by a shaft connected through a ratchet and pawl with the normal internal gear on the lawn mower wheel.

Further purposes appear in the specification and in the claim.

In the drawings I have chosen to illustrate a few only of the numerous embodiments in which my invention may occur, selecting the forms shown from the standpoints of convenience in illustration, satisfactory operation and clear demonstration of the principles involved.

Figure 1 is a fragmentary perspective view showing the rotary rake in its inoperative position and illustrating the sickle bar and rotary cutter.

Figure 2 is a perspective showing the rotary rake in operative position ahead of the sickle bar and lawn mower.

Figure 3 is a detail perspective of the rotary rake.

Figure 6a is an enlarged transverse section showing the modified construction of the rotary rake employed in the invention.

Figure 4:
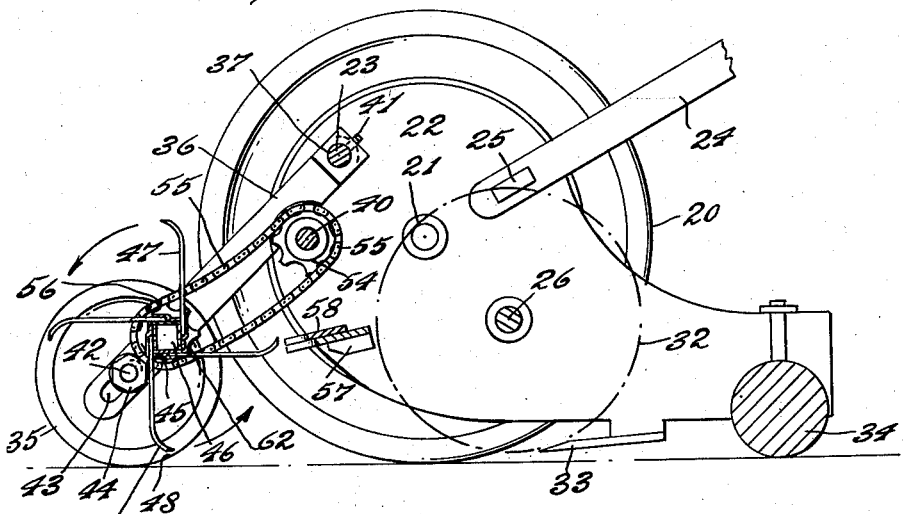
Figure 4 is a central longitudinal section on the line 4—4 of Figure 2 of the lawn mower, sickle bar and rotary rake, with the handle broken away.
Figure 5:
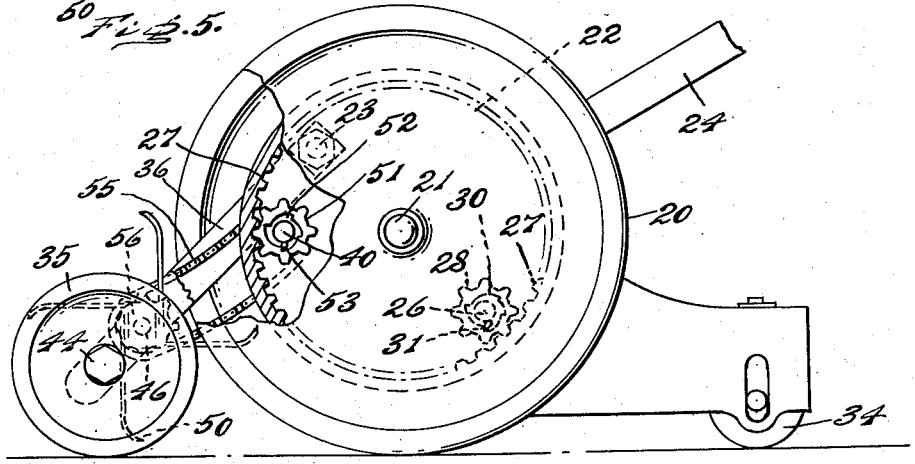
Figure 5 is a fragmentary side elevation of the lawn mower showing the rotary rake, with the sickle bar head behind the lawn mower wheel, and the wheel broken away to show some of the operating mechanism.

In ordinary grass cutting practice using either a standard hand operating lawn mower or a power lawn moker, especially of the type intended for use on individual lawns, difficulty is encountered in cutting grass which has been allowed to grow unduly. The difficulty is encountered both in cutting long grass, in cutting grass which has become matted or trampled and in cutting grass of unequal lengths, some long and some short. The difficulty exposes itself in a tendency to clog the lawn mower, either impeding or preventing operation and also through the tendency to pack down the grass, cutting only some of the grass and leaving relatively long grass which is extended or matted against the ground. This relatively long grass springs up again in a few days, so that the full benefit of the grass cutting is not obtained.

The present invention is designed to permit obtaining uniform and easy cutting of relatively long grass, without tearing out grass by the roots, and without matting or packing down longer grass which is uncut.

In accordance with the invention, a rotary rake is provided which travels ahead of the normal rotary cutter, and ahead of the sickle bar, where used, and which brings its lowermost tines in a rearward sweep above the ground so as not to dig or tear out grass, and desirably at a level slightly above the level of the estimated grass cutting. The rotary rake is desirably pivoted and carried on individual wheels so that it can follow the ground, and also can, where desired, be thrown back out of the way. The rotary rake is desirably driven from the same internal gear which usually is mounted on the lawn mower wheel interconnected by a pinion, and ratchet and pawl to a shaft which is geared to the rotary rake.

In a further aspect of the invention, the same shaft desirably also operates a sickle bar which is interposed between the rotary cutter and the rotary rake, desirably at a level above the level of the rotary cutter anvil, so that grass erected by the rotary rake is first cut by the sickle bar and then by the rotary cutter or bottom knife.

Considering first the form of Figures 1 to 5, the lawn mower is of conventional type, and as well known may be being illustrated. The hand mower itself may be as shown in Bootes U. S. Patent No. 2,094,345, granted September 28, 1937 for Lawn Mower. Lawn mower wheels 20 of usual type are pivotally mounted at 21 on a frame which includes housings 22 at the opposite ends inside the wheels and cross rod 23. A handle 24 is connected to the housings by lugs 25 in recesses in the handle. The housings at the opposite ends journal a cross shaft 26, which is driven in well known manner as by an internal gear 27 on the wheels 20 which is common in lawn mower construction, and which is located on the side of the wheel toward the lawn mower frame. A pinion 28 surrounding the shaft and pivoted thereon carries an internal ratchet 30 which is engaged by a pawl 31 which is resiliently urged in a slot in the shaft (not shown) by a detent spring as well known, so that the pawl extends radially outwardly to extend to the inside of the ratchet, and turns the shaft with the wheels when the lawn mower is moving forward, but not when it is moving backward as well known.

The shaft 26 has a rotary cutter or lawn mower blade 32 which cooperates with bottom plate or knife 33 skirting just above the level of the ground, and mounted suitably adjustably on the frame.

Behind the lawn mower wheels there is a trailing roller 34 engaging the ground and pivoted on the frame as well known.

In a position forwardly located with respect to the lawn mower wheels in operating position I place a pair of rotary rake wheels 35, each engaging the ground desirably directly in front of one of the corresponding lawn mower wheels, and pivotally mounted on bars 36, which are pivoted on pivot blocks 37 surrounding the forward tension rod 23. The pivoting of the blocks 37 is normally free so that the wheels ride the ground under the weight of the rotary rake and follow the variations in the contour of the ground. In the lowermost position notches 38 in the bars desirably raise over journals on the housings which journal cross shaft 40 located relatively forward of the tension rod on which the bars 36 are pivoted, preventing the bars from moving too far downward. When the bars are retracted by swinging the bars around the rod 23, and placed in elevated position, they can be held in that position by set screws 41 engaging the tension rod. The wheels may, if desired, be made adjustable by mounting the inner ends 42 of their pivot shafts in elongated slots 43 of the bars 36 and securing them by nuts 44.

The bars pivotally support at the ends a rotary rake 45 which has intermediate the journalled ends a squared portion 46 which holds suitably resilient wire tines 47 which turn in a direction to make the lowermost tine 48 move rearwardly, and desirably are pointed at 50 in a rearward direction with respect to the motion of the lawn mower when the tines are near the ground. It will be noted that at this position they do not touch the ground but are preferably farther spaced from the ground than the bottom plate or anvil 33 of the lawn mower. The rotary rake is suitably driven by chain mechanism, the preferred drive being as follows: The internal gear 27 at each wheel is engaged by a second pinion 51 which surrounds and journals on shaft 40 and carries an internal ratchet 52 similar to the ratchet 30 which engages a pawl 53 in a radial slot in the shaft similar to the pawl 31.

The shaft 40 at one end has a sprocket 54 which meshes with chain 55, the other end of which meshes with a sprocket 56 on one end of the rotary rake to turn the rake.

The rotary rake can be used with the rotary cutter alone but it is preferable to interpose a sickle bar between the rotary rake and the cutter. The sickle bar desirably comprises a stationary sickle bar 57 which is mounted on the two ends on the frame and which cooperates with and guides a movable sickle bar 58 which is driven by a follower 60 mounted on the movable sickle bar plate and extending into a cylindrical cam 61 on shaft 40 to manipulate the sickle bar reciprocating back and forth. The manner of guiding the movable sickle bar will be conventional, and may be as shown in Hayes U. S. Patent 2,328,803, granted September 7, 1943, for Mower.

Figures 6, 7:
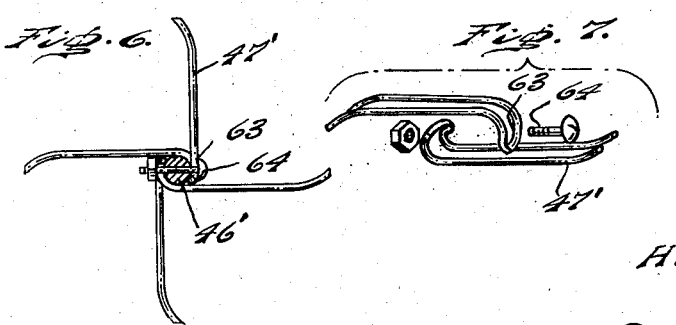
Figure 6 is a fragmentary transverse section showing a modified form of rotary rake.
Figure 7 is a fragmentary exploded perspective of the modified form of rotary rake of Figure 6.

While the square portion on the rotary rake to mount the tines is desirable, using gripping plates 62, suitably secured to the rotary rake, the alternate construction of Figures 6 and 7 can be used in which each of the tines is of U formation having a reverse bend portion 63 which engages around a circular shaft 46' and oppositely disposed tines engaging opposite sides of the shaft are secured to the shaft by bolts 64 extending through the shaft. Thus the tines 47' are arranged in pairs and the tines disposed 90° are placed next to the tines which are in opposed relation alternating across the rake. The tines 47' like those of 47 in Figures 4 and 5 may be desirably made of spring wire, or resilient plastic so that they will deflect if they encounter any heavy impediment.

Figure 6a shows a modified and simplified construction of the rotary rake. In this form a shaft 65 runs the full length of the rotary rake and is surrounded by a tubular housing 66 consisting of two segments 67 and 68 joined together and joined to the shaft 65 by bolts 70 extending through the opposed segments and through the shaft.

The tines $47^2$ have at their inner ends reverse bends 71 and the reverse bend portions are inserted through openings 72 in the segments before the segments are assembled. Longitudinal spacer wires or rods 73 run through the reverse bends inside the segments and prevent the tines from moving too far outwardly or becoming dislodged, since the inner ends of the reverse bends are held firmly by the shaft to force the tines against the spacer wires and to hold the spacer wires against the segments.

In operation with the rotary rake in place on the ground, its tines will erect and position the grass blades and they will then encounter the sickle bar and be cut by the sickle bar if the sickle bar is being used. If, however, the sickle bar has been removed the grass blades will first encounter the rotary rake and in any case they will finally encounter the rotary cutter and be cut in the normal manner. The grass will, however, be cut more advantageously because it is erected and not pushed down, and because it is aligned and not matted.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claim.

Having thus described my invention what I claim as new and desire to secure by Letters Patent is:

A lawn mower having a rotary cutter and means to rotate said cutter, said means comprising an internal gear, a rake drive pinion meshing with said internal gear, a ratchet on the inside of said pinion, a shaft extending through said pinion and said ratchet, a pawl on said shaft engaging said ratchet, and an anvil cooperating with said cutter, in combination with a rotary rake having outwardly extending tines mounted in front of said rotary cutter, said tines having their lowermost ends at a level at least as high as said anvil, sprocket and chain means interconnecting said shaft and said rotary rake to rotate said rake to carry the lowermost said tines back toward said rotary cutter, bars supporting said rotary rake, pivot blocks on said lawn mower pivotally supporting said bars, said bars having an operative position in which said rake is adjacent the ground and an inoperative position in which said rake is thrown back on said lawn mower, a cam on said shaft, a sickle bar between said rotary cutter and said rotary rake, and a cam follower on said sickle bar operatively engaging said cam.

References Cited in the file of this patent
UNITED STATES PATENTS

| | | |
|---|---|---|
| 887,461 | Card | May 12, 1908 |
| 1,814,991 | Wetmore | July 14, 1931 |
| 1,823,219 | Vimtrup | Sept. 15, 1931 |
| 2,075,220 | Neuhausen | Mar. 30, 1937 |
| 2,094,345 | Bootes | Sept. 28, 1937 |
| 2,270,646 | Campbell | Jan. 20, 1942 |
| 2,275,360 | Gargiule et al. | Mar. 3, 1942 |
| 2,328,803 | Hayes | Sept. 7, 1943 |
| 2,546,620 | Van Ness | Mar. 27, 1951 |
| 2,722,795 | Warner | Nov. 8, 1955 |